United States Patent
Kimes

(10) Patent No.: US 7,033,301 B2
(45) Date of Patent: Apr. 25, 2006

(54) PLANET PINION CARRIER ASSEMBLY FOR RAVIGNEAUX GEARSET

(75) Inventor: John Kimes, Wayne, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 10/787,561

(22) Filed: Feb. 26, 2004

(65) Prior Publication Data

US 2005/0192152 A1   Sep. 1, 2005

(51) Int. Cl.
    *F16H 57/08* (2006.01)
(52) U.S. Cl. ............... 475/340; 475/331; 475/338; 475/339; 475/341; 475/342
(58) Field of Classification Search ........ 475/330, 475/331, 338, 339, 340, 332, 252, 10, 341, 475/342
    See application file for complete search history.

(56) References Cited

U.S. PATENT DOCUMENTS

| | | | | |
|---|---|---|---|---|
| 3,939,736 A | * | 2/1976 | Morin | ............ 475/338 |
| 4,892,011 A | * | 1/1990 | Nishida et al. | ............ 475/159 |
| 5,133,697 A | * | 7/1992 | Hattori | ............ 475/276 |
| 5,577,976 A | * | 11/1996 | Haka | ............ 475/280 |
| 6,364,804 B1 | * | 4/2002 | Haka | ............ 475/278 |
| 6,422,971 B1 | * | 7/2002 | Katou et al. | ............ 475/331 |
| 6,468,179 B1 | * | 10/2002 | Mathis et al. | ............ 475/280 |
| 6,663,528 B1 | * | 12/2003 | Haka | ............ 475/303 |
| 2003/0232692 A1 | * | 12/2003 | Chen | ............ 475/331 |
| 2004/0235610 A1 | * | 11/2004 | Jang et al. | ............ 475/331 |

FOREIGN PATENT DOCUMENTS

JP          02229946 A    *  9/1990

* cited by examiner

*Primary Examiner*—Charles A. Marmor
*Assistant Examiner*—David D. Le
(74) *Attorney, Agent, or Firm*—David B. Kelley; MacMillian, Sobanski & Todd

(57) ABSTRACT

A gearset assembly includes a pinion carrier containing first, second and third long pinions pinion mutually spaced angularly about an axis, and supported for rotation on the carrier, and three pairs of short pinions, each supported for rotation on the carrier, the pinions of the first pair meshing with the first long pinion, the pinions of the second pair meshing with the second long pinion, and the pinions of the third pair meshing with the third long pinion.

20 Claims, 4 Drawing Sheets

*Prior Art*

PLANET PINION CARRIER ASSEMBLY FOR RAVIGNEAUX GEARSET

BACKGROUND OF THE INVENTION

The invention relates to gearsets for motor vehicle transmissions, particular to Ravigneaux gearsets for automatic transmissions.

A conventional Ravigneaux gearset includes a single carrier containing two sets of planet pinions, long pinions, and short pinions. Each pinion set includes three pinions, each pinion being mutually spaced angularly about a central axis, each short pinion meshing with a corresponding long pinion. There are two sun gears, a short sun gear meshing with the three short pinions, and a long sun gear meshing with the three long pinions. There is one ring gear, which meshes with the three long pinions.

Both planet pinion sets are supported for rotation on the carrier. Each long pinion is in mesh with a short pinion, the ring gear, and the long sun gear. Each short pinion is in mesh with a long pinion and the short sun gear.

Ravigneaux gearsets are used in many automatic transmissions due to their compact size. A Ravigneaux gearset can be used in lieu of two simple planetary gearsets to produce four forward speeds and a reverse gear. They are smaller, and require fewer components than two simple planetary gearsets because they have a common pinion, one ring gear, and one carrier. Their manufacturing and assembly costs compare favorably to those of simple planetary gearsets.

Ravigneaux gearsets, however, are limited in torque capacity due to the pairing requirement for the pinions. Unlike conventional planetary gear sets, which can be made more robust by adding an extra pinion, the pairing requirement of a Ravigneaux gearset requires that two pinions be added to increase torque capacity. Because there is not enough space in the annular zone surrounding the carrier to add a long pinion and a short pinion, the toque and power capacity of a Ravigneaux gearset is usually increased by making the gearset larger, widening the gears and pinions and increasing the diameter of the shafts, or by incorporating premium processes to the manufacture of the gears, pinions and carrier. But this increases the cost weight and package size of the transmission. Heretofore, Ravigneaux gearsets have been limited to three pairs of planet pinions, a total of six pinions.

There is a need to increases the power and torque capacity of a Ravigneaux gearset, preferably by adding pinions, but without increasing the size of the gearset.

SUMMARY OF THE INVENTION

The proposed design increases the power and torque capacity of a Ravigneaux gearset by adding a second short pinion meshing with each of the three long pinions in the gearset. Each pair of short pinions meshes with a long pinion. This arrangement improves torque capacity by distributing the load across an extra set of pinions, and by sharing the load across multiple mesh points within the pinions. There are six pinion-to-pinion meshes. Each of these meshes reduces the gear stress approximately in half without changing the outside diameter or width of the planetary carrier or pinions. The number of load cycles increases on the long pinions, short pinions, and sun gear. But the magnitude of the gear stress for a given torque is much lower than in a conventional Ravigneaux gearset, and the corresponding service life is greater than the service life of a conventional Ravigneaux gearset.

Although the number of load cycles for some of the pinions and gears increases because the number of mesh points increases, the reduced loading will significantly increase gear life and allow the gearset to be used in higher torque applications. This allows existing gear designs to be modified for higher torque applications without affecting packaging. Future designs can likewise be packaged in a smaller space, thus saving cost and easing packaging constraints on the vehicle.

The nine-pinion Ravigneaux gearset design of this invention has been shown to increase significantly its torque capacity and enables a wider gear ratio to be produced. These factors improve vehicle performance and fuel economy.

A gearset according to the present invention includes a planet pinion carrier containing and supporting first, second and third long pinions mutually spaced angularly about an axis and supported for rotation on the carrier, and three pairs of short pinions, each of those pinions being supported for rotation on the carrier, the pinions of the first pair meshing with the first long pinion, the pinions of the second pair meshing with the second long pinion, the pinions of the third pair meshing with the third long pinion.

The carrier includes a disc substantially perpendicular to, and aligned with the axis, having a first and second sets of axially directed, angularly spaced holes, three posts radially spaced from the axis and extending axially from the disc toward the pinions, each post mutually spaced about the axis and located angularly between two long pinions, and a pad secured to each post, axially spaced from the disc, extending radially toward the axis, and having of two axially directed holes, aligned with a hole of the second set. A backing plate aligned with the axis and spaced axially from the disc has a third set of holes aligned with a hole of the first set, for supporting a pinion on the backing plate.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
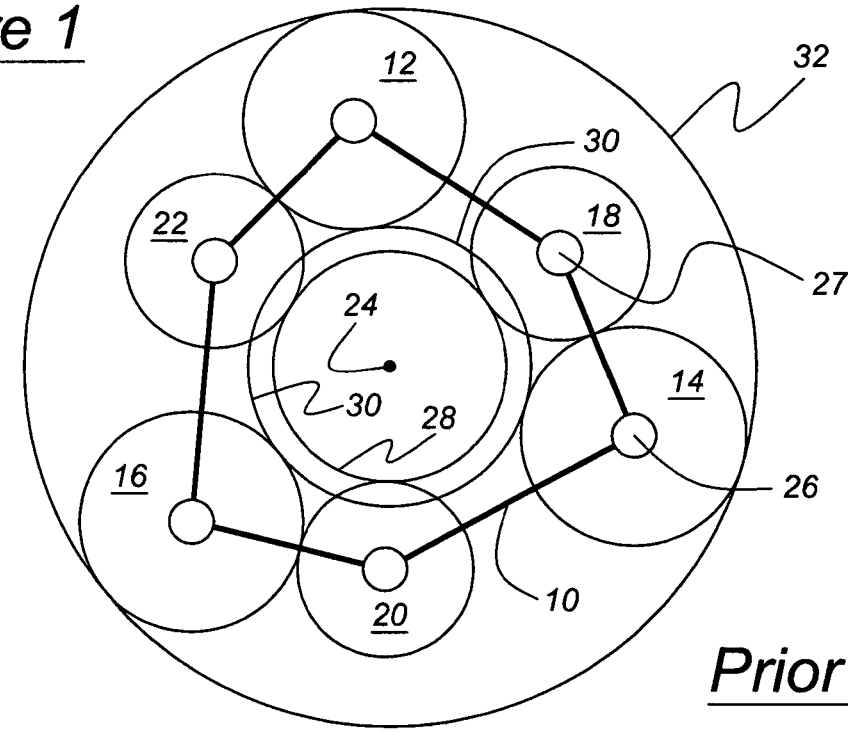
FIG. 1 is an end view of a conventional Ravigneaux gearset.
Figure 2:
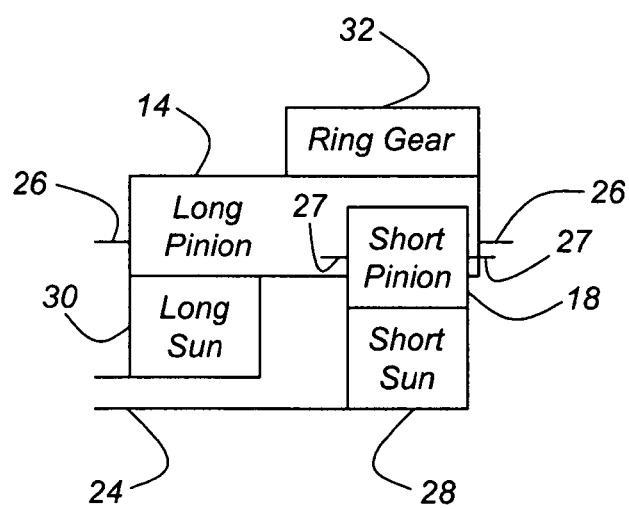
FIG. 2 is a side view of the gearset of FIG. 1.

Referring now to the drawings, FIGS. 1 and 2 illustrate a conventional Ravigneaux gearset, which includes a planet pinion carrier 10 containing three pairs of meshing planet pinions having external gear teeth, the pairs being formed of long pinions 12, 14, 16 and short pinions 18, 20, 22. Each pinion pair is equally spaced angularly about a central axis 24 and includes a short pinion meshing with a corresponding long pinion. Each long pinion 12, 14, 16 is supported for rotation on the carrier 10 on a long pinion shaft 26. Each short pinion 18, 20, 22 is supported for rotation on the carrier 10 on a short pinion shaft 27.

There are two sun gears having external gear teeth, a short sun gear 28 meshing with the three short pinions 18, 20, 22, and a long sun gear 30 meshing with the three long pinions 12, 14, and 16. A ring gear 32, surrounding the sun gears and planet pinions and having internal gear teeth, meshes with the three long pinions. The sun gears 28, 30 and the ring gear 32 are arranged coaxially about axis 24.

Each long pinion 12, 14, 16 is in mesh with a short pinion 18, 20, 22, the ring gear 32, and long sun gear 30. Each short pinion 18, 20, 22 is in mesh with a long pinion 12, 14, 16 and the short sun gear 28. Preferably, the gear teeth of each gear and pinion are helical, involute teeth.

Figure 3:
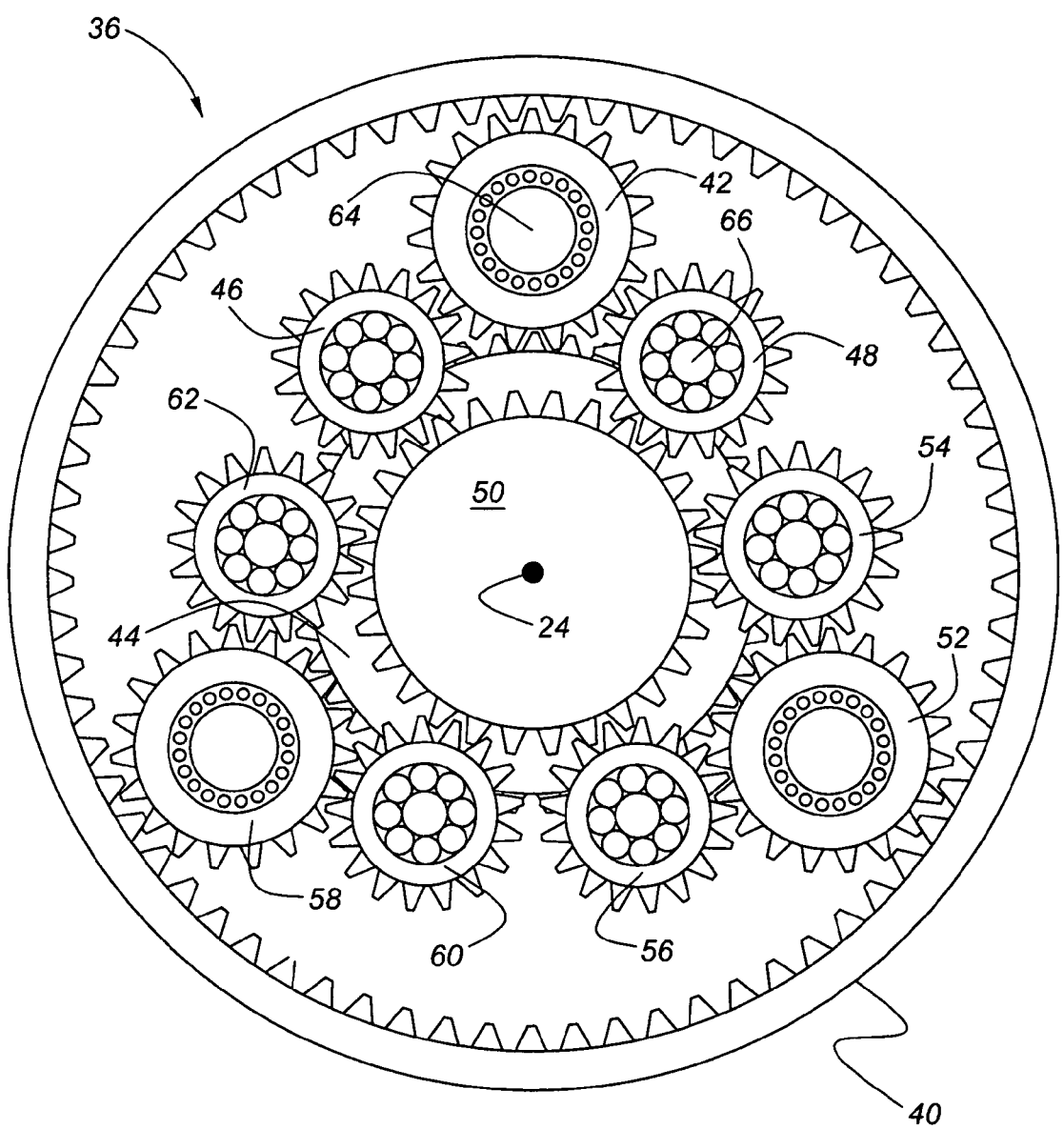
FIG. 3 is an end view of a gearset according to the present invention.
Figure 4:
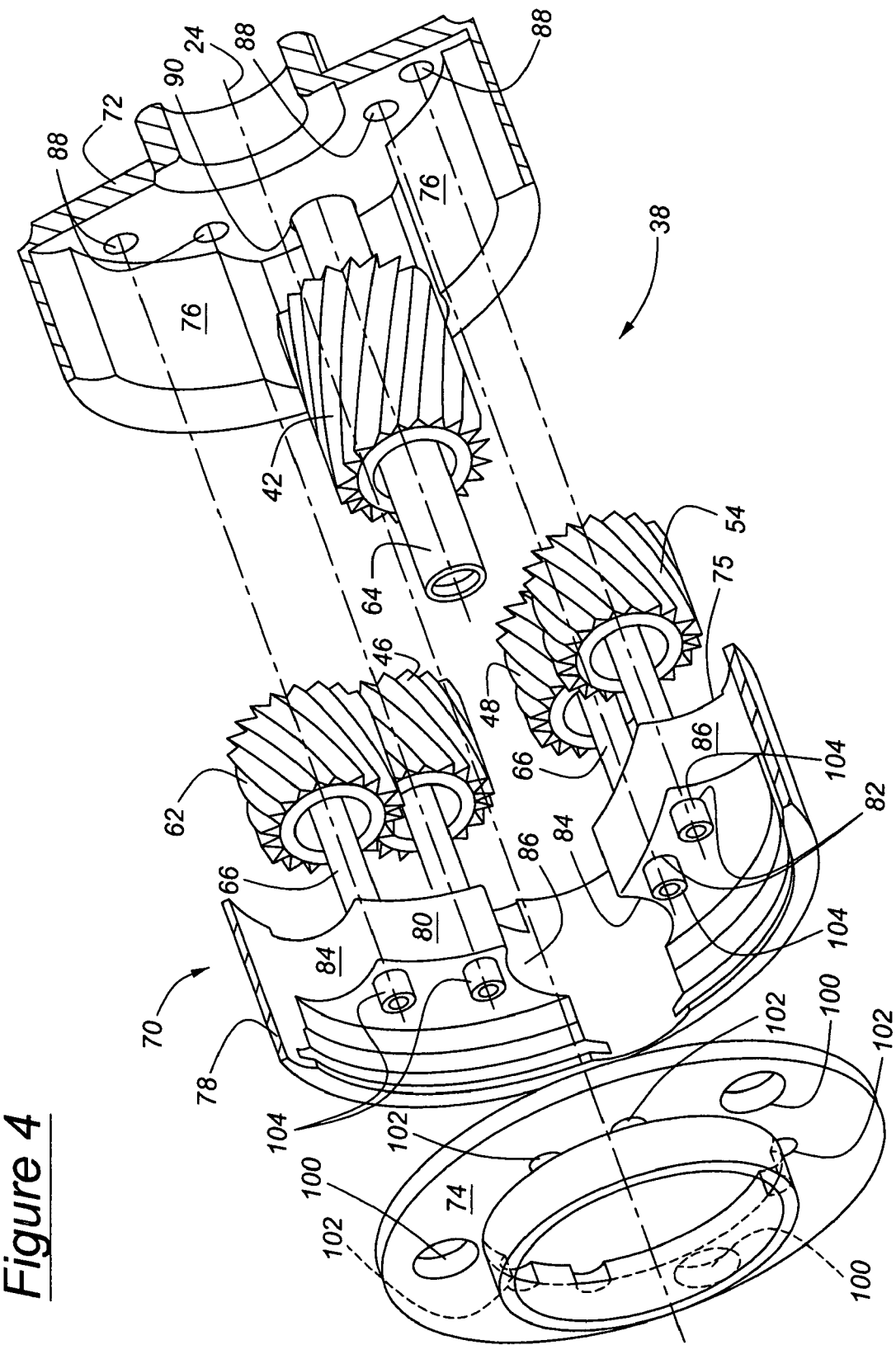
FIG. 4 is an isometric view of the carrier showing the components in mutually spaced relation.
Figure 5:
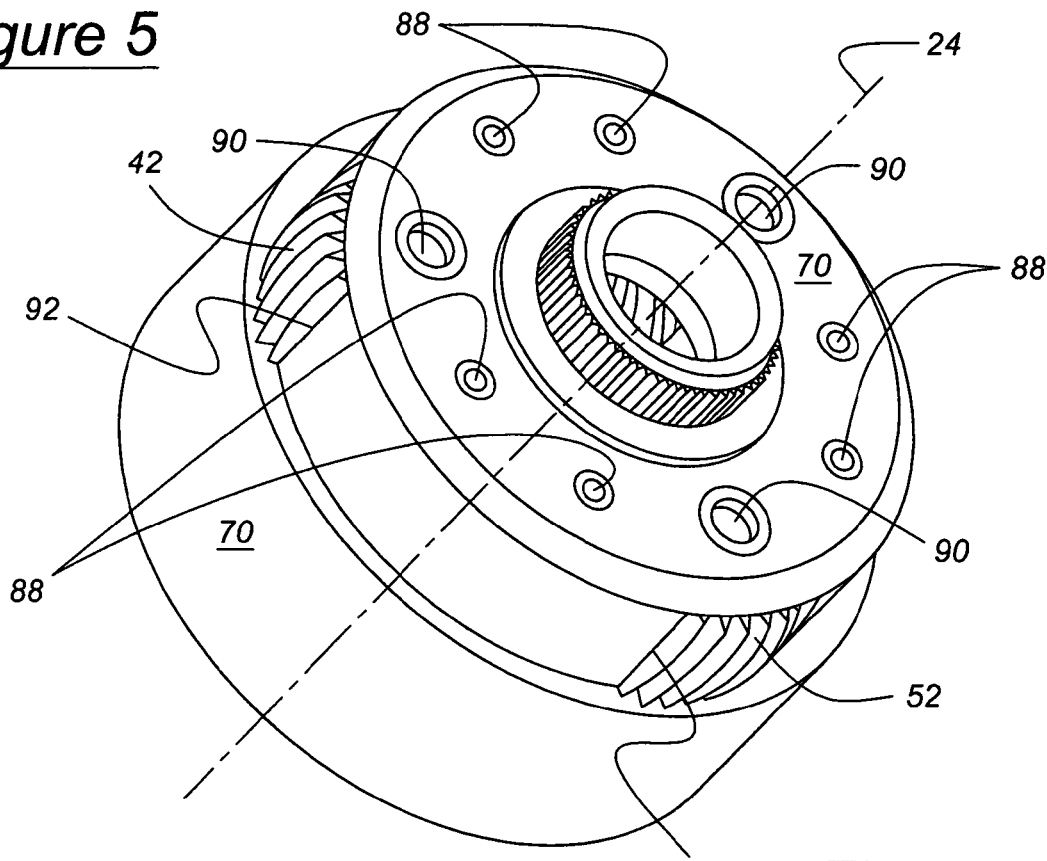
FIG. 5 is an isometric view of the carrier assembly.

Referring now to FIGS. 3–5, the planetary 36 of this invention is supported on a planet pinion carrier 38 containing three sets of planet pinions having external gear teeth, each set including a long pinion and two short pinions. Each pinion is spaced angularly about the longitudinal axis 24 and located in an annular space located radially between a ring gear 40 and axis 24. A first pinion set includes long pinion 42 meshing with ring gear 40, long sun gear 44, and short pinions 46, 48, located on opposite sides of, and meshing with pinion 42 and a short sun gear 50. A second pinion set includes long pinion 52 meshing with ring gear 40, long sun gear 44, and short pinions 54, 56, located on opposite sides of, and meshing with pinion 52. A third pinion set includes long pinion 58 meshing with ring gear 40, long sun gear 44, and short pinions 60, 62, located on opposite sides of, and meshing with pinion 58. Each long pinion 42, 52, 58 is in meshing engagement with two adjacent short pinions, and is supported on the carrier 38 for rotation on a long pinion shaft 64. Each short pinion is in meshing engagement with an adjacent long pinion, and is supported on the carrier 38 for rotation on a short pinion shaft 66. Each pinion shaft 64, 66 carries a needle bearing, on which the corresponding pinion is rotatably supported.

There are two sun gears having external gear teeth, a short sun gear 50 meshing with the six short pinions 46, 48, 54, 56, 60, 62, and a long sun gear 44 meshing with the three long pinions 42, 52, 58. A ring gear 40, surrounding the sun gears and planet pinions and having internal gear teeth, meshes with the three long pinions 42, 52, 58. The sun gears 44, 50 and the ring gear 66 are arranged coaxially about axis 24. Preferably, the gear teeth of each gear and pinion are involute, helical gear teeth.

FIG. 4 shows a carrier assembly 38, which includes a cylindrical shell or drum 70, support 72, and backing plate 74, each formed preferably of powered metal. To facilitate assembly, the pinions are installed in the axial direction onto the carrier 38. The drum 70 and support 72 are assembled and secured mutually by brazing to form the subassembly of FIG. 4. The backing plate 74 is then installed in the drum-support subassembly.

Figure 6:
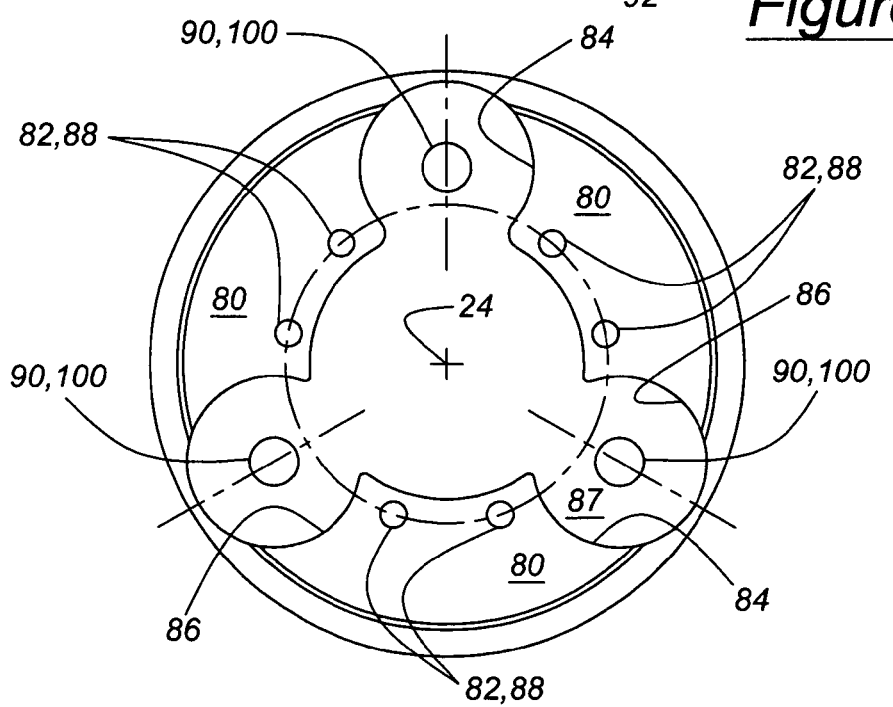
FIG. 6 is an end view of the carrier with the backing plate removed showing the pockets for the long pinions.

Drum 70 includes a cylindrical shell 78 and three radially directed pads 80, mutually spaced angularly about axis 24 and extending toward axis 24 from the shell 78. Each pad 80 is formed with two axially directed pinion shaft holes 82, extending through the thickness of the pad, sized and located to receive a portion of the length of a short pinion shaft 66. The lateral surfaces 84, 86 of each pad, which face an adjacent pad, has a partial circular cylindrical form, such that the lateral surfaces of adjacent pads form a cylindrical pocket 87 sized to receive a long pinion 42, 52, 58. This arrangement is seen best in FIG. 6.

The support 72 is formed with six axially directed, angularly spaced short pinion shaft holes 88, each extending through the thickness of the support and aligned with a hole 82. Holes 88 are each sized and located to receive the end of the short pinion shaft 66 that is axially opposite the shaft end supported at a hole 82.

Three posts 76, fixed to the support 72, are spaced angularly about axis 24, and extend axially into contact with the axial end of each pad 80. Each post 76 is secured to the associated pad 80 preferably by brazing.

Support 72 is formed also with three axially directed, angularly spaced long pinion shaft holes 90, each extending through the thickness of the support and aligned with a cylindrical pocket 87.

FIG. 4 shows four short pinions 46, 62, 60, 56 having been installed in the carrier 38, and supported for rotation on pinion shafts 66, which are fitted in a hole 82 on a pad 80. The axially opposite end of the pinion shafts 66 are fitted into and supported on hole 88 on support 72. The other short pinions 54, 48 are similarly installed and supported. FIG. 5 shows that there are three openings 92, angularly spaced about axis 24, extending circumferentially between adjacent posts 76, and extending axially between support 80 and the shell 78 of drum 70. The gear teeth on the external surface of each long pinion 42, 52, 58 pass axially through an respective opening 92 so that the long pinions mesh with the gear teeth on the internal surface of the ring gear 40.

The backing plate 74 is inserted into the drum such that the long pinion shafts 64 are supported on the backing plate 74 at angularly spaced holes 100 aligned with the long pinion shafts 64. The short pinion shafts 66 are supported on the backing plate 74 at angularly spaced holes 102 aligned with the shafts 66. The backing plate 74 is guided into correct position on the carrier assembly 38 using extensions 104 of the short pinion shafts 66, which extensions engage the holes 102 to guide the plate 74 during assemble. These extensions 104 allow the short pinion shafts 66 to act as locating dowels. The pinion shafts 64, 66 are then staked to the backing plate 74 and support 72, thereby securing the support 72 to the backing plate 74 against relative axial or radial movement.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A gearset assembly comprising:
   a planet pinion carrier;
   first, second and third long pinions having external gear teeth, each pinion mutually spaced angularly about an axis, and supported for rotation on the carrier;
   first, second and third pairs of short pinions having external gear teeth, each short pinion being supported for rotation on the carrier, two pinions of the first pair directly meshing with the first long pinion, two pinions of the second pair directly meshing with the second long pinion, two pinions of the third pair directly meshing with the third long pinion;
   a long sun gear directly meshing with the long pinions;
   a short sun gear directly meshing with the short pinions; and
   a ring gear directly meshing with the long pinions.

2. The gearset assembly of claim 1, wherein the carrier further comprises a support including:

a disc disposed substantially perpendicular to, and aligned with the axis, having a first set of axially directed, angularly spaced holes, and a second set of axially directed, angularly spaced holes;

three posts radially spaced from the axis, extending axially from the disc toward the pinions, each post mutually angularly spaced about the axis; and multiple pads, each pad secured to a respective post, axially spaced from the disc, extending radially toward the axis, and having of two axially directed holes, aligned with a hole of the second set of holes.

3. The gearset assembly of claim 2, wherein the carrier further comprises a drum aligned with the axis, secured to the pads and the posts, and including a radially outer cylindrical surface.

4. The gearset assembly of claim 2, further comprising:

a first group of pinion shafts fitted within a hole of the first set of holes for support on the disc, each pinion shaft of the first group supporting a long pinion for rotation thereon; and a second group of pinion shafts fitted within a hole of the second set of holes for support on the disc, each pinion shaft of the second group supporting a short pinion for rotation thereon, and fitted within a hole on one of said pads.

5. The gearset assembly of claim 2, further comprising:

a first group of pinion shafts fitted within a hole of the first set of holes for support on the disc, each pinion shaft of the first group supporting a long pinion for rotation thereon; and a second group of pinion shafts fitted within a hole of the second set of holes for support on the disc, each pinion shaft of the second group supporting a short pinion for rotation thereon, and fitted within a hole on one of said pads;

a backing plate disposed substantially perpendicular to, and aligned with the axis, spaced axially from the disc, and having a third set of axially directed, angularly spaced holes, each hole of the third set being aligned with a hole of the first set, for supporting a pinion shaft of the first group on the backing plate.

6. The gearset assembly of claim 2, further comprising:

a first group of pinion shafts fitted within a hole of the first set of holes for support on the disc, each pinion shaft of the first group supporting a long pinion for rotation thereon;

a second group of pinion shafts fitted within a hole of the second set of holes for support on the disc, each pinion shaft of the second group supporting a short pinion for rotation thereon, fitted within a hole on a pad, passing axially through a hole of a pad, and including a length portion that extends axially away from one of the pads; and a backing plate disposed substantially perpendicular to, and aligned with the axis, spaced axially from the disc, and having a third set of axially directed, angularly spaced holes, each hole of the third set of holes being aligned with a hole of the first set of holes, for supporting a pinion shaft of the first group on the backing plate, and having a fourth set of axially directed, angularly spaced holes, each hole of the fourth set being aligned with the length portion of a pinion shaft of the second group of pinion shafts.

7. The gearset assembly of claim 2, wherein the carrier further comprises a drum aligned with the axis, secured to the posts, and including a radially outer cylindrical surface; and the drum and support are formed of powdered metal and are secured mutually by brazing.

8. A gearset assembly comprising:

a first long sun gear including external gear teeth;

a second short sun gear including external gear teeth;

a ring gear including internal gear teeth;

a pinion carrier located radially between the ring gear and sun gears;

first, second and third long pinions having external gear teeth, each pinion mutually spaced angularly about an axis, and supported for rotation on the carrier, in meshing engagement with the first long sun gear and the ring gear; and first, second and third pairs of short pinions including external gear teeth, each short pinion being supported for rotation on the pinion carrier and in meshing engagement wit the second short sun gear, the pinions of the first pair meshing with the first long pinion, the pinions of the second pair meshing with the second long pinion, the pinions of the third pair meshing with the third long pinion.

9. The gearset assembly of claim 8, wherein the carrier further comprises a support including:

a disc disposed substantially perpendicular to, and aligned with the axis, having a first set of axially directed, angularly spaced holes, and a second set of axially directed, angularly spaced holes;

three posts radially spaced from the axis, extending axially from the disc toward the pinions, each post mutually angularly spaced about the axis, the posts providing three angularly spaced openings between angularly adjacent posts, each opening sized to permit at least a portion of the gear teeth of the first, second and third pinions to engage the ring gear, and multiple pads, each pad secured to a respective post axially spaced from the disc, extending radially toward the axis, and having of two axially directed holes, aligned with a hole of the second set of holes.

10. The gearset assembly of claim 9, wherein the carrier further comprises a drum aligned with the axis, secured to the pads and the posts, and including a radially outer cylindrical surface.

11. The gearset assembly of claim 9, further comprising:

a first group of pinion shafts fitted within a hole of the first set of holes for support on the disc, each pinion shaft of the first group supporting a long pinion for rotation thereon; and a second group of pinion shafts fitted within a hale of the second set of holes for support on the disc, each pinion shaft of the second group supporting a short pinion for rotation thereon, end fitted within a hole on one of said pads.

12. The gearset assembly of claim 9, further comprising:

a first group of pinion shafts fitted within a hole of the first set of holes for support on the disc, each pinion shaft of the first group supporting a long pinion for rotation thereon; and a second group of pinion shafts fitted within a hole of the second set of holes for support on the disc, each pinion shaft of the second group supporting a short pinion for rotation thereon, and fitted within a hole on one of said pads.

a backing plate disposed substantially perpendicular to, and aligned with the axis, spaced axially from the disc, and having a third set of axially directed, angularly spaced holes, each hole of the third set being aligned with a hole of the first set, for supporting a pinion shaft of the first group on the backing plate.

13. The gearset assembly of claim 9, further comprising:
a first group of pinion shafts fitted within a hole of the first set of holes for support on the disc, each pinion shaft of the first group supporting a long pinion for rotation thereon;
a second group of pinion shafts fitted within a hole of the second set of holes for support on the disc, each pinion shaft of the second group supporting a short pinion for rotation thereon, fitted within a hole on one of said pads, passing axially through a hole of a pad, and including a length portion that extends axially away from the pad; and
a backing plate disposed substantially perpendicular to, and aligned with the axis, spaced axially from the disc, and having a third set of axially directed, angularly spaced holes, each hole of the third set of holes being aligned with a hole of the first set of holes, for supporting a pinion shaft of the first group on the backing plate, and having a fourth set of axially directed, angularly spaced holes, each hole of the fourth set being aligned with the length portion of a pinion shaft of the second group of pinion shafts.

14. The gearset assembly of claim 9, wherein the carrier further comprises a drum aligned with the axis, secured to the posts, and including a radially outer cylindrical surface; and
the drum and support are formed of powdered metal and are secured mutually by brazing.

15. A gearset assembly comprising:
a pinion carrier including
  a disc disposed substantially perpendicular to, and aligned with the axis, having a first set of axially directed, angularly spaced holes, end a second set of axially directed, angularly spaced holes;
  three posts radially spaced from the axis, extending axially from the disc toward the pinions, each post mutually spaced angularly about the axis; and
  multiple pads, each pad secured to one of said posts, axially spaced from the disc, extending radially toward the axis, and having of two axially directed holes, aligned with a hole of the second set, the pads providing axially directed access spaces, each access space being aligned with a hole of the first set of holes;
first, second and third long pinions having external gear teeth, each pinion mutually spaced angularly about an axis, supported for rotation on the carrier, and located in an access space;
first, second and third pairs of short pinions having external gear teeth, each short pinion being supported for rotation on the carrier, the pinions of the first pair directly meshing wit the first long pinion, the pinions of the second pair directly meshing with the second long pinion, the pinions of the third pair directly meshing with the third long pinion;
a long sun gear directly meshing with the long pinions;
a short sun gear directly meshing with the short pinions; and
a ring gear directly meshing with the long pinions.

16. The gearset assembly of claim 15, wherein the carrier further comprises a drum aligned with the axis, secured to the pads and the posts, and including a radially outer cylindrical surface.

17. The gearset assembly of claim 15, further comprising:
a first group of pinion shafts fitted within a hole of the first set of holes for support on the disc, each pinion shaft of the first group supporting a long pinion for rotation thereon; and
a second group of pinion shafts fitted within a hole of the second set of holes for support on the disc, each pinion shaft of the second group supporting a short pinion for rotation thereon, and fitted within a hole on one of said pads.

18. The gearset assembly of claim 15, further comprising:
a first group of pinion shafts fitted within a hole of the first set of holes for support on the disc, each pinion shaft of the first group supporting a long pinion for rotation thereon; and
a second group of pinion shafts fitted within a hole of the second set of holes for support on the disc, each pinion shaft of the second group supporting a short pinion for rotation thereon, and fitted within a hole on one of said pads;
a backing plate disposed substantially perpendicular to, and aligned with the axis, spaced axially from the disc, and having a third set of axially directed, angularly spaced holes, each hole of the third set being aligned with a hole of the first set, for supporting a pinion shaft of the first group on the backing plate.

19. The gearset assembly of claim 15, further comprising:
a first group of pinion shafts fitted within a hole of the first set of holes for support on the disc, each pinion shaft of the first group supporting a long pinion for rotation thereon;
a second group of pinion shafts fitted within a hole of the second set of holes for support on the disc, each pinion shaft of the second group supporting a short pinion for rotation thereon, fitted within a hole on one of said pads, passing axially through a hole of said pad, and including a length portion that extends axially away from the pad; and
a backing plate disposed substantially perpendicular to, and aligned with the axis, spaced axially from the disc, and having a third set of axially directed, angularly spaced holes, each hole of the third set of holes being aligned with a hole of the first set of holes, for supporting a pinion shaft of the first group on the backing plate, and having a fourth set of axially directed, angularly spaced holes, each hole of the fourth set being aligned with the length portion of a pinion shaft of the second group of pinion shafts.

20. The gearset assembly of claim 15, wherein the carrier further comprises a drum aligned with the axis, secured to the posts, and including a radially outer cylindrical surface; and
the drum and support are formed of powdered metal and are secured mutually by brazing.

* * * * *